United States Patent

Munoz Saiz

[11] Patent Number: 6,109,567
[45] Date of Patent: Aug. 29, 2000

[54] FLIGHT CONTROLS WITH AUTOMATIC BALANCE

[76] Inventor: Manuel Munoz Saiz, San Emilio 16, 1, 3, Madrid, Spain, 28017

[21] Appl. No.: 09/110,744

[22] Filed: Jul. 2, 1998

[30] Foreign Application Priority Data

Jan. 14, 1998 [ES] Spain ..................................... 9800050

[51] Int. Cl.⁷ ....................................................... B64C 3/50
[52] U.S. Cl. .............................................................. 244/215
[58] Field of Search .................................... 244/217, 216, 244/215, 213

[56] References Cited

U.S. PATENT DOCUMENTS

| | | | |
|---|---|---|---|
| 3,987,984 | 10/1976 | Fischer | 244/44 |
| 3,994,452 | 11/1976 | Cole | 244/44 |
| 4,053,124 | 10/1977 | Cole | 244/219 |
| 5,115,996 | 5/1992 | Moller | 244/12.5 |
| 5,794,893 | 8/1998 | Diller et al. | 246/213 |

*Primary Examiner*—Robert P. Swiatek
*Attorney, Agent, or Firm*—Robert M. Schwartz

[57] ABSTRACT

Flight controls with automatic balance for use in control of the movement of an aircraft through a fluid system, the control system consists of ailerons divided into two parts, which at low speed adopt the shape of a conventional aileron and rotate in their entirety with the same degree and at high speeds, a part of it rotates or extends to a determinated angle by means of the actuator and the other part of the aileron, that is hinged or articulated to the main part of the aileron, rotates with reference to the main part as a function of the air speed pressure, opposing to this rotation by means of one or more springs.

12 Claims, 2 Drawing Sheets

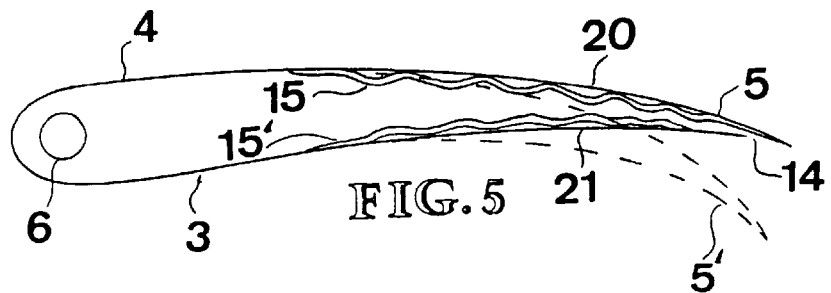
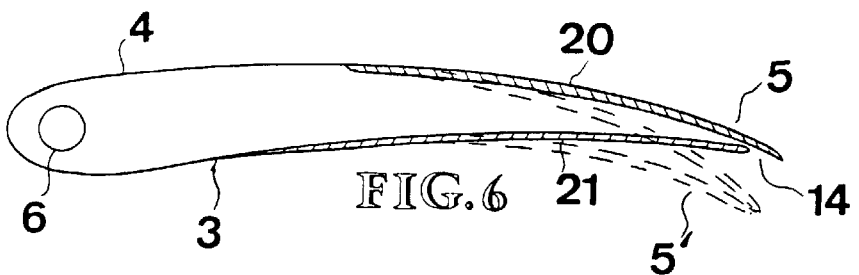
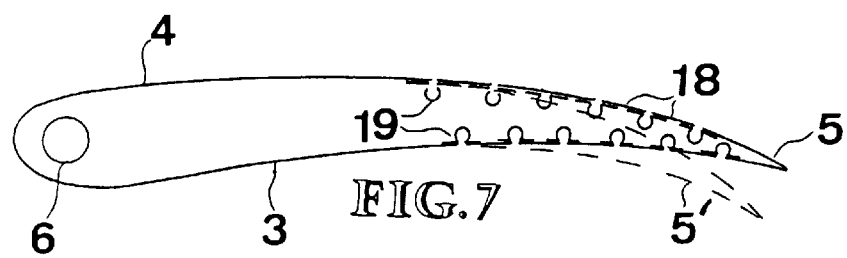
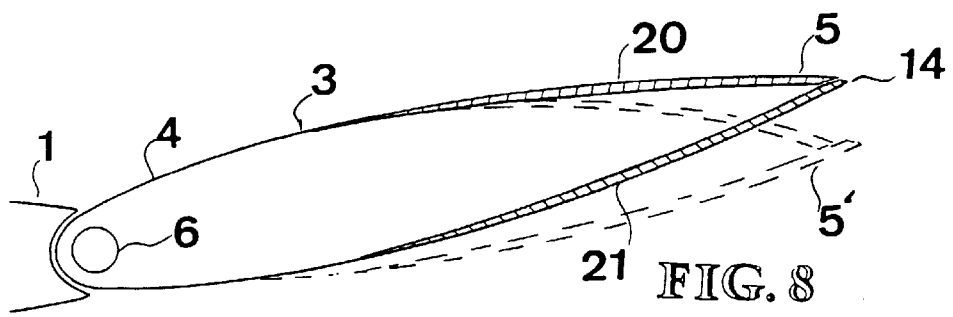
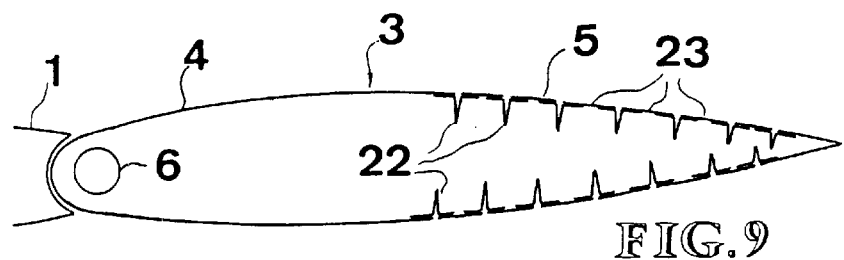

FLIGHT CONTROLS WITH AUTOMATIC BALANCE

CROSS-REFERENCES TO RELATED APPLICATIONS

This application claims the benefit of Spanish Patent Application P9800050 filed on Jan. 14, 1998, according to the provisions of 35 U.S.C. §119 and the Paris Convention for the Protection of Industrial Property.

BACKGROUND OF THE INVENTION

1. Field of the Invention

This invention relates to a flight control system for use in an aircraft which compensates aerodynamically for variations in airspeed or fluid pressure by changing the amount of deflection required to provide such a control.

2. Description of the Prior Art

Aircraft flight controls take the form of primary and secondary surfaces which are hinged to the trailing or aft portion of directional, horizontal stabilizer members and wings on the aircraft. Said members may include ailerons, elevators, rudders and flaps. The orientation of these flight controls is changed by means of an hydraulic, pneumatic, or electric system which are operated by the pilot or autopilot by means of one or two actuators. Most of these systems use two one-piece ailerons (also known as surfaces). One aileron operates at all speeds and the other aileron only only operates at low speed. The aileron's extension is changed as a function of airspeed; the aileron's extension is reduced as the airspeed increases. Other like flaps are acted manually by steps (also known as states). In all cases, the deflection is increased as the airspeed decreases.

SUMMARY OF THE INVENTION

The invention encompasses flight controls with automatic balance for use in control of the movement of an aircraft through a fluid system. Said control system comprises ailerons divided into two parts: a rigid front part and a flexible second part. At low speed, said ailerons adopt the shape of a conventional aileron and rotate in their entirety with the same degree. At high speeds, the front part of said ailerons rotates to a determinated angle by means of the actuator and the rear part of the aileron flexes rearwards as a function of the air speed pressure. Springs built into the flexible part oppose this rotation.

The mechanical resistance of springs may be exponential, linear, or other desired type. The springs may be chosen to operate throughout the movement or only in a low or high-speed zone.

The two piece ailerons use springs and adopt the form of a variable thickness aerodynamic profile.

The ailerons may be hollow or compacted, of variable cross-section, tapering toward the trailing edge. Both have an aerodynamic profile with hollow ailerons. Hot air is made to flow through them to heat them emerging through holes.

At high speeds, the dynamic air pressure forces the flaps to retract completely so that together with the wing, they form an aerodynamic profile. The flaps may also be of rigid design, articulated from the wing, and turning on a shaft. The flaps further comprise springs or strips that extended at low speed and retract at high speed.

The flap size, whether of one or more elements, provides a large surface to allow for greater lift without the need for leading edge flaps.

Rotating flaps around a tubular shaft are joined by means of a cardan to the shaft of the symmetrical flap to avoid asymmetry.

Provided that springs are closed to the rotating shaft, they provide its safe use.

An additional over-center spring can hold the aileron.

Provided that this system acts automatically and with the use of only some springs, some devices and controls used to control the secondary or low speed surfaces are avoided. This makes the invention simple, dependable, and more economical.

BRIEF DESCRIPTION OF THE DRAWINGS

FIGS. 3 through 7 show lateral, schematic cross-section view of the device.

FIGS. 8 and 9 show partial, side, schematic, cross-section views of the stabilizer or wings with their elevators, or ailerons.

DETAILED DESCRIPTION OF THE PREFERRED EMBODIMENTS

Figure 1:
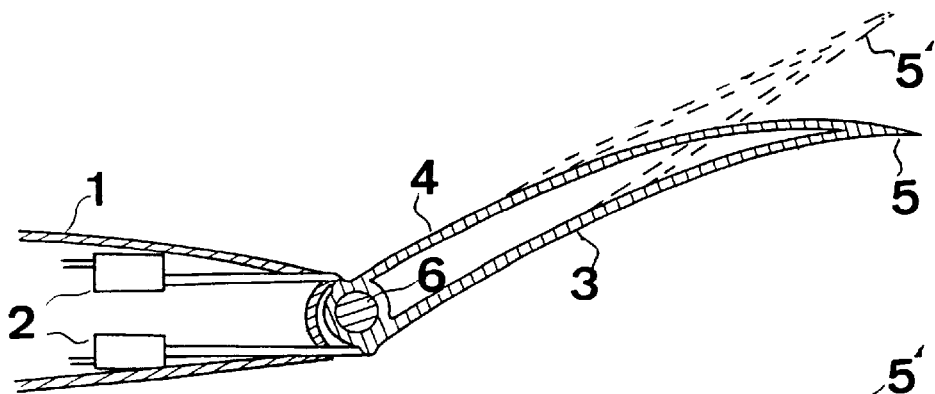
FIG. 1 shows a partial side schematic cross-sectional view of the device.

FIG. 1 depicts the wing 1, the hydraulic actuators 2, the aileron 3, the front part 4 of the aileron 3, the rear part of the ailerons at high-speed 5 and at low-speed 5', and the hinge 6.

Figure 2:
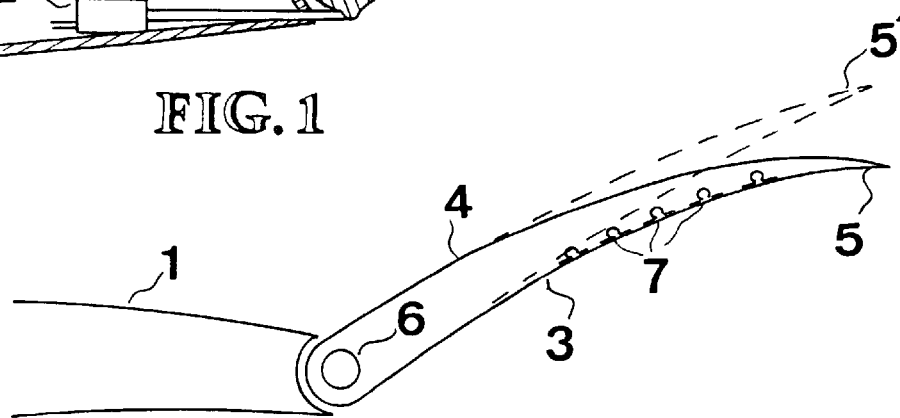
FIG. 2 shows a partial and schematic, cross-sectional view the device.

FIG. 2 depicts the wing 1, the aileron 3, the rear part at high speed 5 and at low-speed 5', and spring 7.

Figure 3:
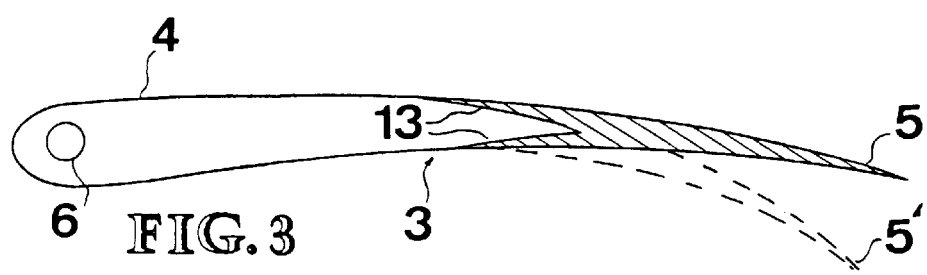

FIG. 3 depicts the aileron 3, the rear part at high-speed 5 and at low-speed 5' and the strip 13. A strip is on the lower zone between the wing and the flap and along its length.

Figure 4:
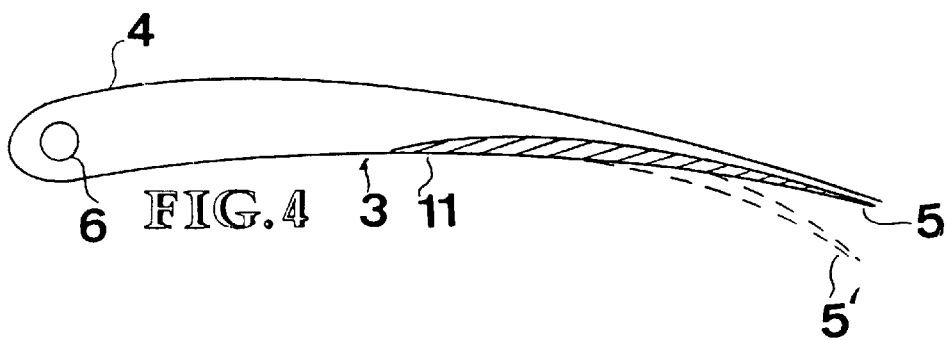

FIG. 4 depicts the aileron 3, the rear part high-speed 5 and at low-speed 5', and the strip 11 that connects the rear part 5 to the front of part 4. Strip 11 is under front part 4.

FIG. 5 depicts the aileron 3, the rear part at high speeds 5 and at low speeds 5', and two wavy strips. The wavy strips are inside aileron 3. The first wavy strip 15 attaches to top surface 20. The second wavy strip 15' attaches to bottom surface 21.

FIG. 6 depicts the aileron 3, hinge 6, rear part at high-speed 5 and at low-speed 5'. Rear part 5 has a top surface 20 and bottom surface 21 that contact each other at trailing edge 14. Top surface 20 and bottom surface 21 are not permanently joined.

FIG. 7 depicts aileron 3, rear part at high-speed 5 and at low-speed 5'. Rear part is formed by a plurality of plates 18. Each plate is joined to the adjacent plate by a spring 19.

FIG. 8 depicts wing 1 joined to aileron 3 by hinge 6. Aileron 3 rotates on hinge 6. Aileron 3 has a front part 4 that is rigid, and a rear part 5 that is flexible. Rear part is shown in its position at high speed 5 and its position at low speed 5'. Rear part 5 has a flexible top surface 20 and flexible bottom surface 21. Top surface and bottom surface contact each other along trailing edge 14. Top surface 20 and bottom surface 21 are not permanently connected.

FIG. 9 depicts the wing 1 connected to the aileron 3 by hinge 6. Aileron 3 has a front part 4 and rear part 5. Rear part 5 is made by a plurality of plates 23 that define the surface of rear part 5. Plates 23 are joined by strips 22 that extend laterally along aileron 3.

I claim:

1. Flight controls with automatic balance that at low speed adopt the shape of a conventional aileron and at high speed flex backward comprising:
   a wing,
   an aileron comprising:
      a front part, wherein said front part is rigid,
      a rear part, wherein said rear part is flexible and is connected to said front part,
   a hinge that connects said wing to the front section of said aileron,
   an actuator that rotates said aileron on said hinge, and,
   springs that tend to keep said rear part in line with said front part.

2. Fight controls with automatic balance as described in claim 1, wherein said springs flex according to an exponential function.

3. Flight controls with automatic balance as described in claim 1, wherein said aileron is of variable cross-section, tapering to a trailing edge.

4. Flight controls with automatic balance as described in claim 3,
   wherein said rear part further comprises:
      a top surface that is flexible, and
      a bottom surface that is flexible, and
   said top surface and bottom surface contact each other at said trailing edge but are not permanently joined.

5. Flight controls with automatic balance that at low speed adopt the shape of a conventional aileron and at high speed flex backward comprising:
   a wing,
   an aileron comprising:
      a front part, wherein said front part is rigid,
      a rear part, wherein said rear part is flexible and is connected to said front part,
   a hinge that connects said wing to the front section of said aileron,
   an actuator that rotates said aileron on said hinge, springs that tend to keep said rear part in line with said front part, wherein the rear part is attached to the front part by a strip that extends from said rear part to under said front part.

6. Flight controls with automatic balance that at low speed adopt the shape of a conventional aileron and at high speed flex backward comprising:
   a wing,
   an aileron comprising:
      a front part, wherein said front part is rigid,
      a rear part, wherein said rear part is flexible and is connected to said front part,
   a hinge that connects said wing to the front section of said aileron,
   an actuator that rotates said aileron on said hinge, springs that tend to keep said rear part in line with said front part, wherein said rear part further comprises:
      a top surface,
      a bottom surface,
      a first wavy strip wherein said first wavy strip is inside said aileron and is attached to said top surface, and
      a second wavy strip, wherein said second wavy strip is inside said aileron and is attached to said bottom top surface.

7. Flight controls with automatic balance that at low speed adopt the shape of a conventional aileron and at high speed flex backward comprising:
   a wing,
   an aileron comprising:
      a front part, wherein said front part is rigid,
      a rear part, wherein said rear part is flexible and is connected to said front part,
   a hinge that connects said wing to the front section of said aileron,
   an actuator that rotates said aileron on said hinge, springs that tend to keep said rear part in line with said front part, wherein said rear part comprises a plurality of plates wherein each plate has a strip extending laterally across said plate.

8. Flight controls with automatic balance that at low speed adopt the shape of a conventional aileron and a high speed flex backward comprising:
   two symmetric wings, wherein each of said wings is connected by a hinge to an aileron comprising:
      a front part, wherein said front part is rigid,
      a rear part, wherein said rear part is flexible and is connected to said front part,
   an actuator that rotates said ailerons on said hinges, and
   springs that tend to keep said rear part in line with said front part.

9. Flight controls with automatic balance that at low speed adopt the shape of a conventional control surface aileron, rudder or elevator and at high speed flexes backward comprising:
   a wing,
   a flight control surface having
      a first rigid section, and a second flexible section connected to said first rigid section,
   a hinge that connects said wing to said first rigid section of said flight control surface,
   an actuator that rotates said flight control surface on said hinge, and,
   a spring that tends to keep said second flexible section in line with said first rigid second.

10. Flight controls with automatic balance as described in claim 9, wherein said flight control surface is a rudder.

11. Flight controls with automatic balance as described in claim 9, wherein said flight control surface is an elevator.

12. Flight controls with automatic balance as described in claim 9, wherein said flight control surface is an aileron.

* * * * *